US 11,073,133 B2

(12) United States Patent
Zheng et al.

(10) Patent No.: US 11,073,133 B2
(45) Date of Patent: Jul. 27, 2021

(54) SYSTEM AND METHOD FOR CONTROLLING THE OPERATION OF A WIND TURBINE

(71) Applicants: General Electric Company, Schenectady, NY (US); Danian Zheng, Greenville, SC (US); Shuang Gu, Shanghai (CN); Veronica Hernandez-Ortiz, Greenville, SC (US); Xiongzhe Huang, Shanghai (CN); David Forrest Loy, Schenectady, NY (US); Ramy Michael Souri, Greenville, SC (US)

(72) Inventors: Danian Zheng, Greenville, SC (US); Shuang Gu, Shanghai (CN); Veronica Hernandez-Ortiz, Greenville, SC (US); Xiongzhe Huang, Shanghai (CN); David Forrest Loy, Schenectady, NY (US); Ramy Michael Souri, Greenville, SC (US)

(73) Assignee: General Electric Company, Schenectady, NY (US)

( * ) Notice: Subject to any disclaimer, the term of this patent is extended or adjusted under 35 U.S.C. 154(b) by 941 days.

(21) Appl. No.: 15/522,892

(22) PCT Filed: Oct. 31, 2014

(86) PCT No.: PCT/CN2014/089970
§ 371 (c)(1),
(2) Date: Apr. 28, 2017

(87) PCT Pub. No.: WO2016/065594
PCT Pub. Date: May 6, 2016

(65) Prior Publication Data
US 2017/0321654 A1  Nov. 9, 2017

(51) Int. Cl.
F03D 7/04 (2006.01)
F03D 7/02 (2006.01)
G05B 15/02 (2006.01)

(52) U.S. Cl.
CPC ............ *F03D 7/043* (2013.01); *F03D 7/028* (2013.01); *F03D 7/0276* (2013.01); *F03D 7/047* (2013.01);
(Continued)

(58) Field of Classification Search
CPC ........ F03D 7/043; F03D 7/0276; F03D 7/028; F03D 7/047; G05B 15/02
See application file for complete search history.

(56) References Cited

U.S. PATENT DOCUMENTS 8,082,782 B2  12/2011 Esteban Cornejo
8,380,357 B2   2/2013 Garcia Barace et al.
(Continued)

FOREIGN PATENT DOCUMENTS

CN  101660492 A  3/2010
CN  102913385 A  2/2013
(Continued)

OTHER PUBLICATIONS

International Search Report and Written Opinion issued in connection with corresponding PCT Application No. PCT/CN2014/089970 dated Jul. 17, 2015.
(Continued)

Primary Examiner — Nathan L Laughlin
(74) Attorney, Agent, or Firm — Dority & Manning, P.A.

(57) ABSTRACT

A method for controlling the operation of a wind turbine may generally include monitoring a current yaw position of a nacelle of the wind turbine, wherein the current yaw position is located within one of a plurality of yaw sectors defined for the nacelle. In addition, the method may include
(Continued)

monitoring a wind-dependent parameter of the wind turbine and determining a variance of the wind-dependent parameter over time, wherein the variance is indicative of variations in a wind parameter associated with the wind turbine. Moreover, the method may include determining at least one curtailed operating setpoint for the wind turbine when the variance exceeds a predetermined variance threshold, wherein the curtailed operating setpoint(s) is determined based at least in part on historical wind data for the yaw sector associated with the current yaw position.

16 Claims, 6 Drawing Sheets

(52) U.S. Cl.
CPC ...... *G05B 15/02* (2013.01); *F05B 2270/1011* (2013.01); *F05B 2270/309* (2013.01); *F05B 2270/32* (2013.01); *F05B 2270/321* (2013.01); *F05B 2270/322* (2013.01); *F05B 2270/329* (2013.01); *F05B 2270/335* (2013.01); *Y02E 10/72* (2013.01)

(56) References Cited

U.S. PATENT DOCUMENTS

| | | | |
|---|---|---|---|
| 8,495,911 | B2 | 7/2013 | Andersen et al. |
| 8,649,911 | B2 | 2/2014 | Avagliano et al. |
| 2002/0067274 | A1* | 6/2002 | Haller ............... F03D 80/00 340/601 |
| 2007/0268002 | A1* | 11/2007 | Guang ............... H02P 9/006 322/28 |
| 2009/0206605 | A1 | 8/2009 | Schmidt |
| 2012/0134807 | A1 | 5/2012 | Axelsson et al. |
| 2014/0017080 | A1 | 1/2014 | Porm et al. |
| 2014/0175795 | A1* | 6/2014 | Ide ............... F03D 7/0204 290/44 |
| 2014/0244188 | A1* | 8/2014 | Bai ............... F03D 17/00 702/60 |
| 2015/0086356 | A1* | 3/2015 | Perley ............... F03D 7/043 416/1 |

FOREIGN PATENT DOCUMENTS

| | | |
|---|---|---|
| CN | 103807096 A | 5/2014 |
| CN | 103953503 A | 7/2014 |
| EP | 2 067 989 A2 | 6/2009 |
| EP | 2 249 029 A2 | 11/2010 |
| EP | 2 719 893 A1 | 4/2014 |
| WO | 2009/068036 A2 | 6/2009 |
| WO | 2013/117470 A1 | 8/2013 |
| WO | 2015/085465 A1 | 6/2015 |

OTHER PUBLICATIONS

Extended European Search Report and Opinion issued in connection with corresponding EP Application No. 14904663.3 dated May 29, 2018.

* cited by examiner

SYSTEM AND METHOD FOR CONTROLLING THE OPERATION OF A WIND TURBINE

FIELD OF THE INVENTION

The present subject matter relates generally to wind turbines and, more particularly, to a system and method for controlling the operation of wind turbine in a manner that avoids overspeed and/or runaway conditions due to rapidly changing wind conditions.

BACKGROUND OF THE INVENTION

Wind power is considered one of the cleanest, most environmentally friendly energy sources presently available and wind turbines have gained increased attention in this regard. A modern wind turbine typically includes a tower, generator, gearbox, nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is geared to a generator for producing electricity.

In many instances, wind turbines are operated at locations with significantly varying wind conditions. For example, wind turbines are often subject to sudden wind gusts, high turbulence intensities and/or abrupt changes in the direction of the wind. Such rapidly changing wind conditions make it difficult to control the operation of a wind turbine in a manner that avoids tripping of the turbine due to overspeed and/or runaway conditions. For instance, when there is an abrupt change in the wind direction at a wind turbine site, a wind turbine located at the site perceives the change in wind direction as a drop in wind speed. As a result, the typical control action implemented by the turbine controller is to pitch the blades in a manner that provides increased efficiency at the perceived, lower wind speeds. Unfortunately, for a wind turbine site with rapidly changing wind conditions, the wind direction may shift back to the original direction in a very short period of time, thereby immediately subjecting the wind turbine to increased wind speeds. Such an abrupt increase in the wind speed following a control action to pitch the rotor blades to a more efficient pitch angle can lead to overspeed and runaway conditions for the wind turbine, which may necessitate tripping the turbine to avoid component damage and/or unsafe operation.

Accordingly, an improved system and method that allows for the operation of a wind turbine to be effectively and efficiently controlled despite substantially varying wind conditions would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling the operation of a wind turbine. The method may generally include monitoring a current yaw position of a nacelle of the wind turbine, wherein the current yaw position is located within one of a plurality of yaw sectors defined for the nacelle. In addition, the method may include monitoring a wind-dependent parameter of the wind turbine and determining a variance of the wind-dependent parameter over time, wherein the variance is indicative of variations in a wind parameter associated with the wind turbine. Moreover, the method may include determining at least one curtailed operating setpoint for the wind turbine when the variance exceeds a predetermined variance threshold, wherein the curtailed operating setpoint(s) is determined based at least in part on historical wind data for the yaw sector associated with the current yaw position.

In another aspect, the present subject matter is directed to a method for controlling the operation of a wind turbine. The method may generally include monitoring a current yaw position of a nacelle of the wind turbine, wherein the current yaw position is located within one of a plurality of yaw sectors defined for the nacelle. The method may also include monitoring a generator speed of the wind turbine, monitoring a wind speed associated with the wind turbine, and determining a standard deviation of the generator speed over time, wherein the variance is indicative of variations in the wind speed. In addition, the method may include determining at least one curtailed operating setpoint for the wind turbine when the variance exceeds a predetermined variance threshold and when the wind speed exceeds a predetermined wind speed threshold, wherein the curtailed operating setpoint(s) is determined based at least in part on historical wind data for the yaw sector associated with the current yaw position. Moreover, the method may include operating the wind turbine based on the curtailed operating setpoint(s).

In a further aspect, the present subject matter is directed to a system for controlling the operation of a wind turbine. The system may generally include a computing device including a processor and associated memory. The memory may store instructions that, when implemented by the processor, configure the computing device to monitor a current yaw position of a nacelle of the wind turbine, wherein the current yaw position is located within one of a plurality of yaw sectors defined for the nacelle. The computing device may also be configured to monitor a wind-dependent parameter of the wind turbine and determine a variance of the wind-dependent parameter over time, wherein the variance is indicative of variations in a wind parameter associated with the wind turbine. In addition, the computing device may be configured to determine at least one curtailed operating setpoint for the wind turbine when the variance exceeds a predetermined variance threshold, wherein the curtailed operating setpoint(s) is determined based at least in part on historical wind data for the yaw sector associated with the current yaw position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
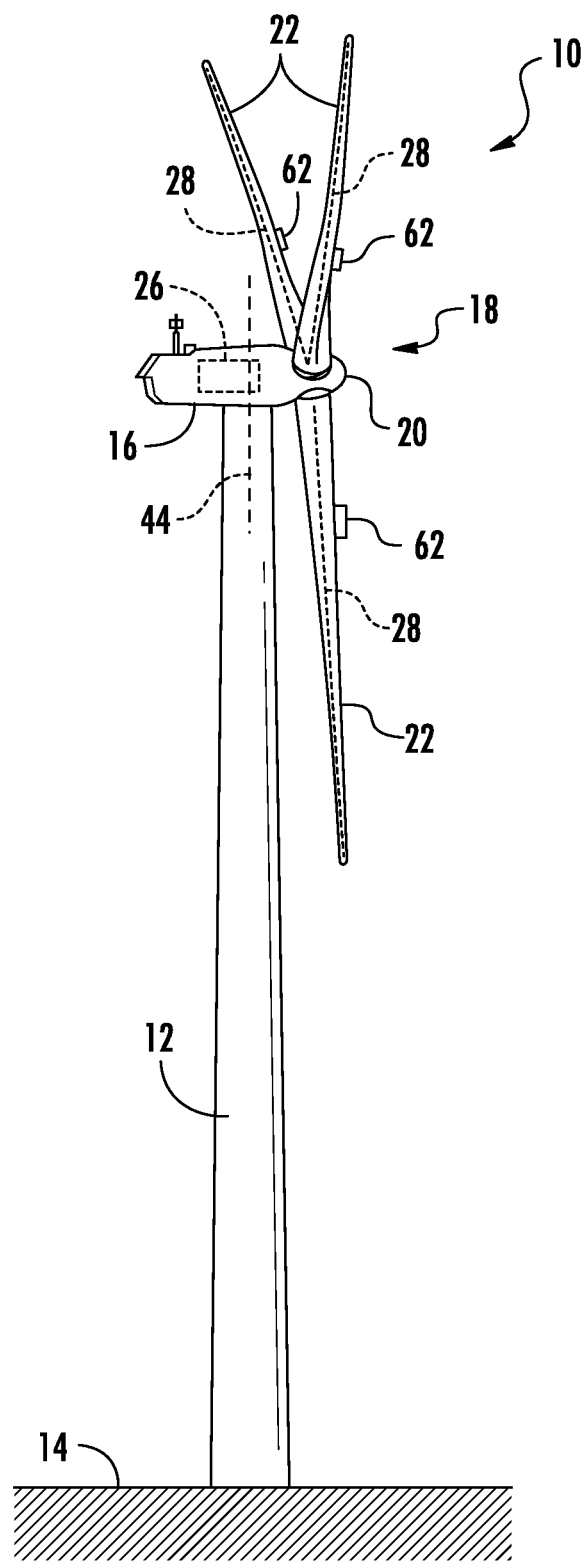
FIG. 1 illustrates a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling the operation of a wind turbine. In several embodiments, the disclosed system and method may be utilized to curtail or de-rate the operation of a wind turbine when the turbine is being subjected to rapidly changing wind conditions. Specifically, in one embodiment, the turbine controller of a wind turbine may be configured to monitor the variability of one or more wind-dependent parameters of the wind turbine, which, in turn, may provide an indication of variations in one or more wind parameters associated with the wind turbine. For example, the turbine controller may be configured to calculate the standard deviation in the generator speed occurring over a relatively short period of time (e.g., over 5 seconds). A relatively high standard deviation for the generator speed (e.g., higher than a predetermined variance threshold defined for the generator speed) may indicate that the wind turbine is currently experiencing rapidly changing wind conditions, such as abrupt changes in the wind speed and/or wind direction, sudden wind gusts and/or increased turbulence intensity. In such instance, the turbine controller may be configured to de-rate the wind turbine by selecting one or more curtailed operating setpoints for the wind turbine, such as a reduced generator speed setpoint or a reduced generator torque setpoint. Once the variability in the generator speed is reduced, the turbine controller may then be configured to up-rate the wind turbine back to its normal or non-curtailed operating setpoints.

Additionally, in several embodiments, when de-rating the wind turbine due to high variability in the monitored wind-dependent parameter, the turbine controller may be configured to take into account historical wind data associated with the yaw sector within which the nacelle is currently located to select an appropriate curtailed operating setpoint(s) for the turbine. Specifically, the yaw range of travel of the nacelle (e.g., a 360 degree circle) may be divided into a plurality of different yaw sectors. In such embodiments, the turbine controller may be provided with or may be configured to collect wind data associated with each wind sector. For example, wind data related to the variability in the wind speed, wind direction, wind gusts and/or turbulence intensity experienced by each yaw sector may be stored within the controller's memory. The turbine controller may then reference the historical wind data when selecting the curtailed operating setpoint(s) for the wind turbine. In particular, if the yaw sector within which the nacelle is currently located typically experiences rapidly changing wind conditions, the controller may set a setpoint limit(s) for the operating setpoint(s) that provides a relatively high operating margin in order to avoid overspeed and/or runaway conditions. However, if the historical wind data indicates that the yaw sector is typically not subjected to rapidly changing wind conditions, the controller may set a setpoint limit(s) for the operating setpoint(s) that provides a lower operating margin.

Referring now to the drawings, FIG. 1 illustrates a perspective view of one embodiment of a wind turbine 10 in accordance with aspects of the present subject matter. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16 (or disposed at any other suitable location within and/or relative to the wind turbine 10). In general, the turbine controller 26 may comprise a computing device or any other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals to one or more pitch drives or pitch adjustment mechanisms 32 (FIG. 2) of the wind turbine 10. Similarly, the turbine controller 26 may be configured to adjust the yaw angle of the nacelle 16 (i.e., an angle that determines a perspective of the nacelle 16 relative to the direction of the wind) about a yaw axis 44 of the wind turbine 10. For example, the controller 26 may transmit suitable control signals to one or more yaw drive mechanisms 46 (FIG. 2) of the wind turbine 10 to automatically control the yaw angle.

Figure 2:
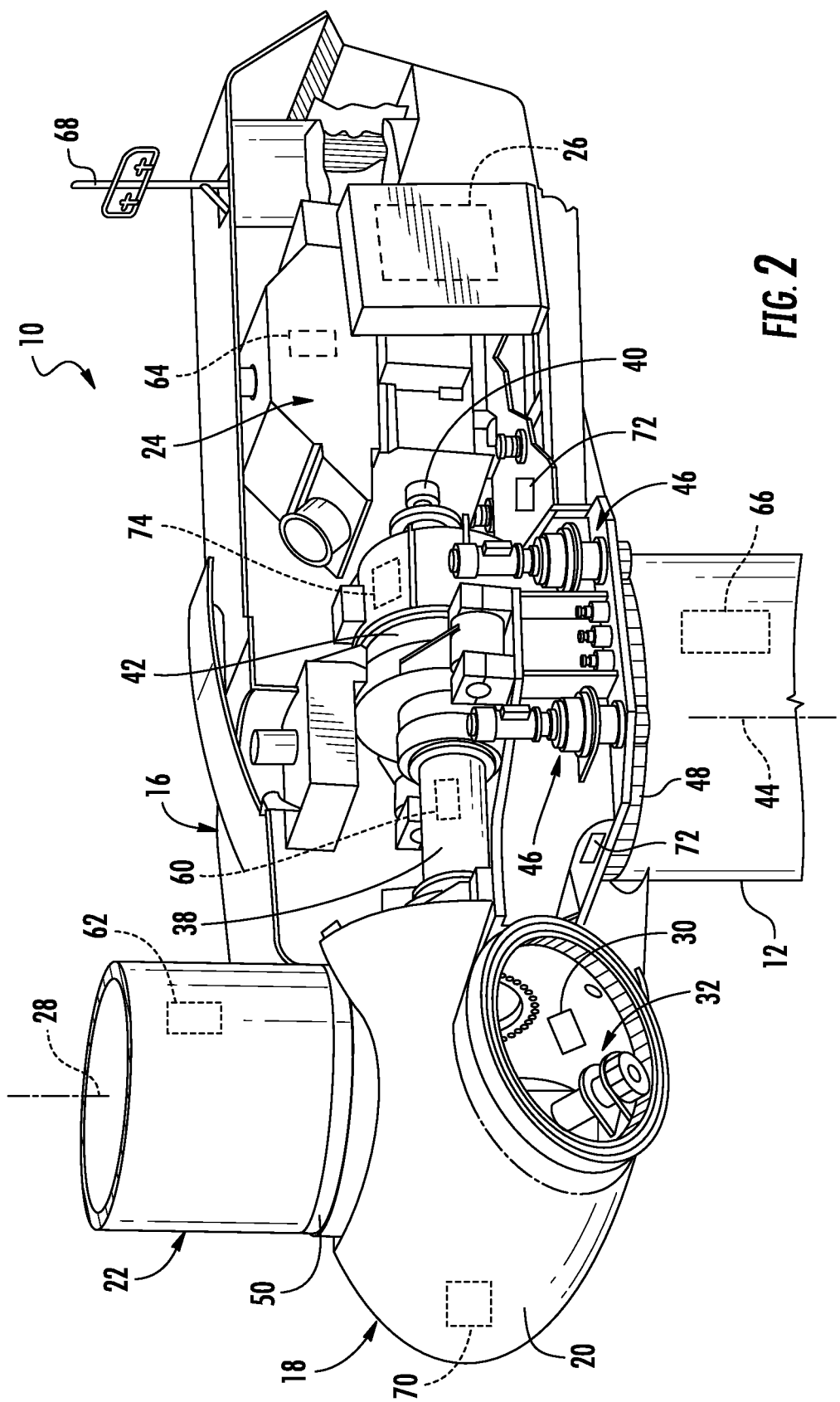
FIG. 2 illustrates an internal view of one embodiment of a nacelle of the wind turbine shown in FIG. 1

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 38 coupled to the hub 20 for rotation therewith. The rotor shaft 38 may, in turn, be rotatably coupled to a generator shaft 40 of the generator 24 through a gearbox 42. As is generally understood, the rotor shaft 38 may provide a low speed, high torque input to the gearbox 42 in response to rotation of the rotor blades 22 and the hub 20. The gearbox 42 may then be configured to convert the low speed, high torque input to a high speed, low torque output to drive the generator shaft 40 and, thus, the generator 24.

Additionally, as indicated above, the controller 26 may also be located within the nacelle 16 (e.g., within a control box or panel). However, in other embodiments, the controller 26 may be located within any other component of the wind turbine 10 or at a location outside the wind turbine 10. As is generally understood, the controller 26 may be communicatively coupled to any number of the components of the wind turbine 10 in order to control the operation of such components. For example, as indicated above, the controller 26 may be communicatively coupled to each pitch adjustment mechanism 32 of the wind turbine 10 (one for each rotor blade 22) via a pitch controller 30 to facilitate rotation of each rotor blade 22 about its pitch axis 28. Similarly, the controller 26 may be communicatively coupled to one or more yaw drive mechanisms 46 of the wind turbine 10 for adjusting the yaw angle or position of the nacelle 16. For instance, the yaw drive mechanism(s) 46 may be configured to adjust the yaw position by rotationally engaging a suitable yaw bearing 48 (also referred to as a slewring or tower ring gear) of the wind turbine 10, thereby allowing the nacelle 16 to be rotated about its yaw axis 44.

In addition, the wind turbine 10 may also include one or more sensors for monitoring various operating parameters of the wind turbine 10. For example, in several embodiments, the wind turbine 10 may include one or more shaft sensors 60 configured to monitor one or more shaft-related operating parameters of the wind turbine 10, such as the loads acting on the rotor shaft 38 (e.g., thrust, bending and/or torque loads), the deflection of the rotor shaft 38 (e.g., including shaft bending), the rotational speed of the rotor shaft 38 and/or the like. The wind turbine may also include one or more blades sensors 62 (FIGS. 1 and 2) configured to monitor one or more blade-related operating parameters of the wind turbine 10, such as the loads acting on the blades 22 (e.g., bending loads), the deflection of the blades 22 (e.g., including blade bending, twisting and/or the like), the vibration of the blades 22, the noise generated by the blades 22, the pitch angle of the blades 22, the rotational speed of the blades 22 and/or the like. Additionally, the wind turbine 10 may include one or more generator sensors 64 configured to monitor one or more generator-related operating parameters of the wind turbine 10, such as the power output of the generator 24, the rotational speed of the generator 24, the generator torque and/or the like.

Moreover, the wind turbine 10 may also include various other sensors for monitoring numerous other turbine operating parameters. For example, as shown in FIG. 2, the wind turbine 10 may include one or more tower sensors 66 for monitoring various tower-related operating parameters, such as the loads acting the tower 12, the deflection of the tower 12 (e.g., tower bending and/or twisting), tower vibrations and/or the like. In addition, the wind turbine 10 may include one or more wind sensors 68 for monitoring one or more wind parameters associated with the wind turbine 10, such as the wind speed, the wind direction, wind gusts, the turbulence or turbulence intensity of the wind and/or the like. Similarly, the wind turbine 10 may include one or more hub sensors 70 for monitoring various hub-related operating conditions (e.g., the loads transmitted through the hub 20, hub vibrations and/or the like), one or more nacelle sensors 72 for monitoring one or more nacelle-related operating conditions (e.g., the loads transmitted through the nacelle 16, nacelle vibrations, the yaw angle or position of the nacelle 16 and/or the like) and/or one or more gearbox sensors 74 for monitoring one or more gearbox-related operating conditions (e.g., gearbox torque, gearbox loading, rotational speeds within the gearbox and/or the like). Of course, the wind turbine 10 may further include various other suitable sensors for monitoring any other suitable operating conditions of the wind turbine 10. It should be appreciated that the various sensors described herein may correspond to pre-existing sensors of a wind turbine 10 and/or sensors that have been specifically installed within the wind turbine 10 to allow one or more operating parameters to be monitored.

It should also be appreciated that, as used herein, the term "monitor" and variations thereof indicates that the various sensors of the wind turbine 10 may be configured to provide a direct measurement of the operating parameters being monitored or an indirect measurement of such operating parameters. Thus, the sensors may, for example, be used to generate signals relating to the operating parameter being monitored, which can then be utilized by the controller 26 to determine the actual operating parameters. For instance, measurement signals provided by generator sensor(s) 64 that measure the power output of the generator 24 along with the measurement signals provided by the blade sensor(s) 62 that measure the pitch angle of the rotor blades 22 may be used by the controller 26 to estimate one or more wind-related parameters associated with the wind turbine 10, such as the wind speed.

Figure 3:
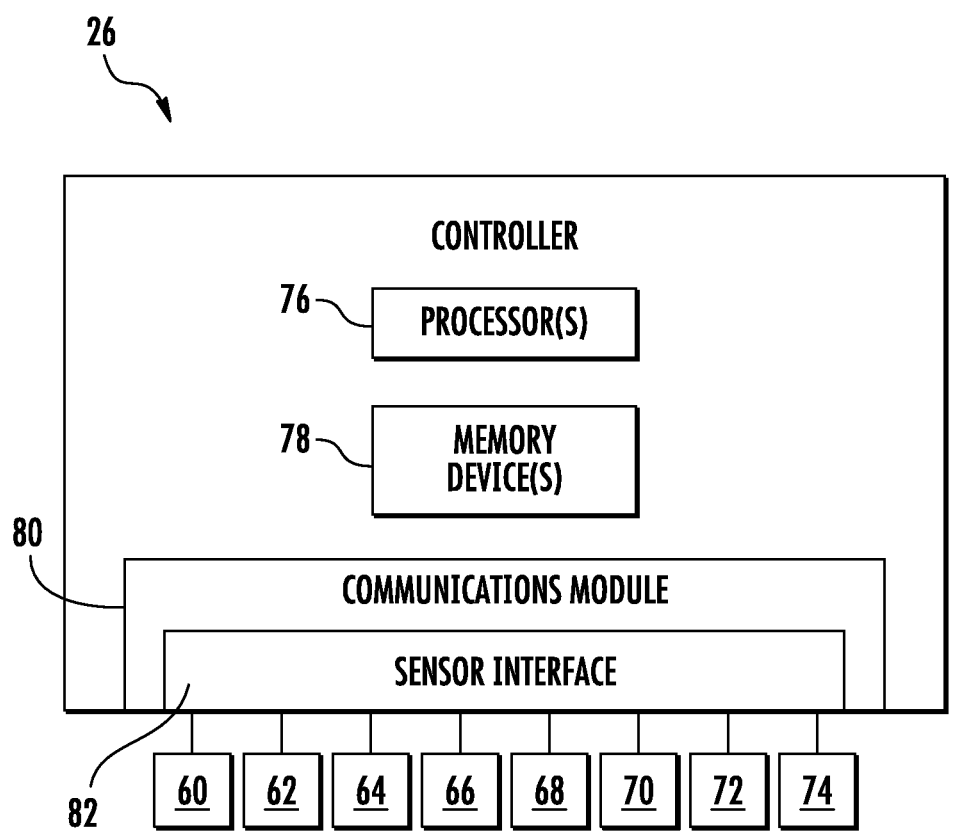
FIG. 3 illustrates a schematic diagram of one embodiment of a turbine controller suitable for use within a wind turbine in accordance with aspects of the present subject matter.

Referring now to FIG. 3, a block diagram of one embodiment of suitable components that may be included within the controller 26 is illustrated in accordance with aspects of the present subject matter. As shown, the controller 26 may include one or more processor(s) 76 and associated memory device(s) 78 configured to perform a variety of computer-implemented functions (e.g., performing the methods, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 78 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 78 may generally be configured to store suitable computer-readable instructions that, when implemented by the processor(s) 76, configure the controller 26 to perform various functions including, but not limited to, implementing the control algorithm(s) 100 and/or method(s) 200 disclosed herein with reference to FIGS. 4 and 6.

Additionally, the controller 26 may also include a communications module 80 to facilitate communications between the controller(s) 26 and the various components of the wind turbine 10. For instance, the communications module 80 may include a sensor interface 82 (e.g., one or more analog-to-digital converters) to permit the signals transmitted by the sensor(s) 60, 62, 64, 66, 68, 70, 72, 74 to be converted into signals that can be understood and processed by the processors 76.

Figure 4:
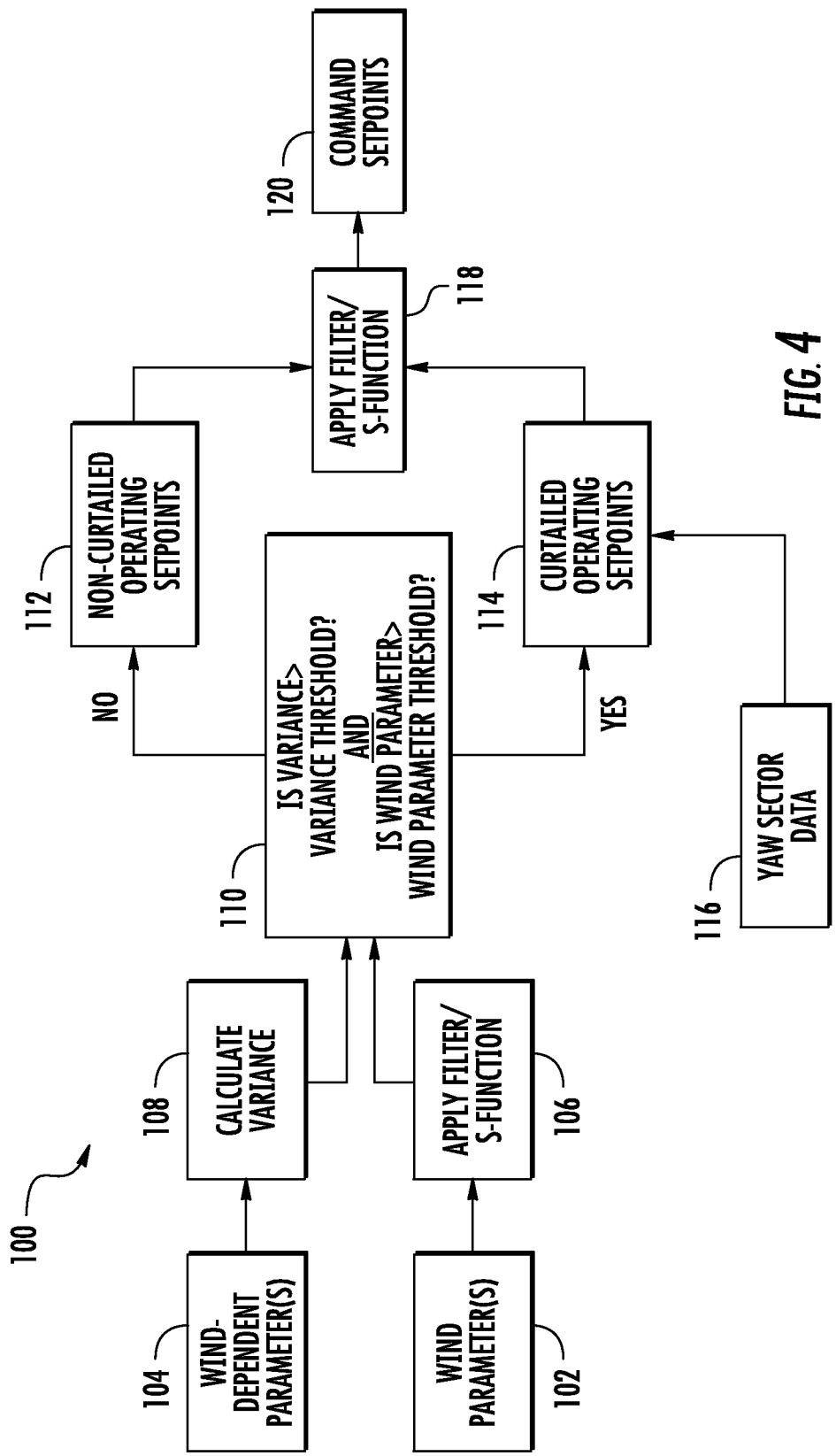
FIG. 4 illustrates a flow diagram of one embodiment of a control algorithm that may be implemented by a turbine controller in order to control the operation of a wind turbine in accordance with aspects of the present subject matter.

Referring now to FIG. 4, a diagram of one embodiment of a control algorithm 100 that may be implemented by a turbine controller 26 in order to control the operation of a wind turbine 10 is illustrated in accordance with aspects of the present subject matter. As indicated above, the disclosed algorithm 100 may, in several embodiments, be advantageously applied when a wind turbine 10 is subject to one or more substantially varying wind parameters, such as a wind speed, wind direction, wind gust and/or turbulence intensity that varies significantly over time. In particular, the algorithm 100 described herein may allow for the operation of a wind turbine 10 to be de-rated or curtailed in an efficient and effective manner in instances in which the local wind parameter(s) for the turbine 10 are changing significantly within a relatively short period of time. Such de-rating or curtailment of the wind turbine 10 may allow for overspeed and/or runaway conditions to be avoided despite the occurrence of sudden or rapid changes in the wind parameter(s) associated with the wind turbine 10.

As shown in FIG. 4, the turbine controller 26 may be configured to receive one or more input signals associated with one or more monitored operating parameters of the wind turbine 10, such as one or more wind parameters 102 and one or more wind-dependent parameters 104. For example, the disclosed algorithm 100 will generally be described herein with reference to the turbine controller 26 receiving input signals associated with a monitored wind speed for the wind turbine 10. However, in other embodiments, the turbine controller 26 may be configured to monitor any other suitable wind parameters 102 associated with the wind turbine 10, such as the wind direction, the turbulence intensity of the wind, wind gusts and/or the like. Additionally, the disclosed algorithm 100 will generally be described herein with reference to the turbine controller 26 receiving input signals associated a monitored generator speed. However, in other embodiments, the turbine controller 26 may be configured to monitor any other suitable wind-dependent parameter(s) 104 that provides an indication of the variability in one or more of the wind parameter(s), such as the power output of the wind turbine 10, the generator torque and/or the like.

In several embodiments, the controller 26 may be configured to apply one or more suitable filters or S-functions (as shown at box 106) to the monitored wind parameter(s) 102. For example, as indicated above, the turbine controller 26 may be configured to estimate the wind speed based on one or more other monitored operating parameters of the wind turbine 10, such as by estimating the wind speed based on the pitch angle of the rotor blades 22 and the power output of the generator 24. In such embodiments, the estimated wind speed provided by the turbine controller 26 may be highly variable. Thus, in several embodiments, application of the corresponding filter(s) and/or S-function(s) may allow for the variations in the estimated wind speed to be accommodated within the system.

For example, in one embodiment, the controller 26 may be configured to input the monitored wind parameter(s) 102 into a low-pass filter. As is generally understood, the low-pass filter may be configured to filter out the high frequency signals associated with the monitored wind parameter(s) 102, thereby providing more reliable data. For instance, the low-pass filter may be configured to pass low-frequency signals associated with the monitored wind parameter(s) 102 but attenuate (i.e. reduces the amplitude of) signals with frequencies higher than a given cutoff frequency.

Additionally, in one embodiment, the filtered or unfiltered wind parameter(s) 102 may be input into an S-function to smooth or stabilize the input signals associated with the wind parameter(s) 102. As is generally understood, the S-function may correspond to a mathematical equation having an S-shape. For example, in one embodiment, the S-function may be represented by: $y=k/(1+a*\exp(b*x))$, wherein k, a, and b are parameters of the S-curve, x is the input, and y is the output. Of course, it should be understood by those skilled in the art that the S-function may also be any other suitable mathematical function, e.g. a Sigmoid function.

Referring still to FIG. 4, the turbine controller 26 may also be configured to calculate a variance in the wind-dependent parameter(s) 104 over time (indicated at box 108), with the variance generally being indicative of the variability in the monitored wind parameter(s). Specifically, fluctuations in one or more of the wind parameter(s) 102 associated with the wind turbine 10 may result in corresponding variations in one or more of the wind-dependent parameters 104. Thus, by calculating the variance in the monitored wind-dependent parameter(s) 104 over time, such variance may provide a strong indication of the instability or variability in the associated wind parameter(s) 102.

In several embodiments, the variance calculated by the turbine controller 26 may correspond to a standard deviation of the wind-dependent parameter(s) 104 occurring across a given time period. For example, the generator speed may be continuously monitored and stored within the controller's memory 78. The stored data may then be utilized to calculate the standard deviation of the generator speed across a relatively short period of time (e.g., 5 seconds). A high standard deviation may indicate that one or more of the wind parameter(s) 102 is rapidly changing whereas a low standard deviation may indicate that the wind parameter(s) 102 is remaining relatively stable over the specific time period.

Additionally, the turbine controller 26 may, in several embodiments, be configured to apply one or more adaptive filters (not shown) to smooth and/or stabilize the calculated variance 108 so as to improve the overall system stability. In such embodiments, the adaptive filter(s) may correspond to any suitable type of filter(s), such as a low-pass filter, high-pass filter and/or band-pass filter.

As shown in FIG. 4, based on the calculated variance and the wind parameter(s) input, the controller 26 may be configured to select or calculate one or more operating setpoints for the wind turbine 10, such as a generator speed setpoint and/or a generator torque setpoint. In doing so, the turbine controller 26 may be configured (at box 110) to compare the monitored wind parameter(s) to a predetermined wind parameter threshold and the calculated variance to a predetermined variance threshold in order to determine whether to apply the normal or non-curtailed operating setpoints typically provided for the wind turbine (indicated at box 112) or to instead apply one or more curtailed operating setpoints so as to de-rate the wind turbine 10 (indicated at box 114). Specifically, in several embodiments, the threshold values for the wind parameter and variance thresholds may be selected such that, when each input parameter exceeds its corresponding threshold, it is indicative of operating conditions in which there is a high likelihood that the wind turbine 10 may experience an overspeed or runway condition. In such instance, the turbine controller 26 may be configured to select a reduced operating setpoint(s) that curtails or de-rates the operation of the wind turbine 10, thereby allowing the turbine 10 to ride-through the unstable operating conditions with greater safety or operating margins.

For example, in a particular embodiment, a predetermined variance threshold may be utilized that corresponds to a standard deviation value for the generator speed above which it can be inferred that the wind turbine 10 is being subjected to dynamic, rapidly changing wind conditions. Similarly, in such an embodiment, the predetermined wind parameter threshold may, for example, correspond to a wind speed value above which there is an increased likelihood for the wind turbine 10 to be placed in a potential overspeed or runway condition given the dynamic, rapidly changing wind conditions. As such, when the standard deviation for the generator speed exceeds the corresponding variance threshold and the wind speed exceeds the corresponding wind speed threshold, the turbine 10 may be de-rated by applying a reduced or curtailed operating setpoint(s) in a manner so as to prevent the overspeed/runway condition. For instance, the generator speed setpoint may be reduced in a manner that provides for an increased speed margin for the wind turbine 10, thereby allowing the turbine 10 to continue to be safely operated despite the dynamic and varying wind conditions.

It should be appreciated that, in several embodiments, the threshold values associated with the variance and the wind parameter correspond to minimum threshold values. Additionally, in several embodiments, a maximum threshold value may also be associated with the variance and/or wind parameter for determining when to apply the curtailed operating setpoint(s). For example, in a particular embodiment, it may be desired that the monitored wind parameter (e.g., wind speed) fall within a given range of values (e.g., a range bound by a predetermined minimum threshold and a predetermined maximum threshold) prior to applying the curtailed operating setpoint(s).

Figure 5:
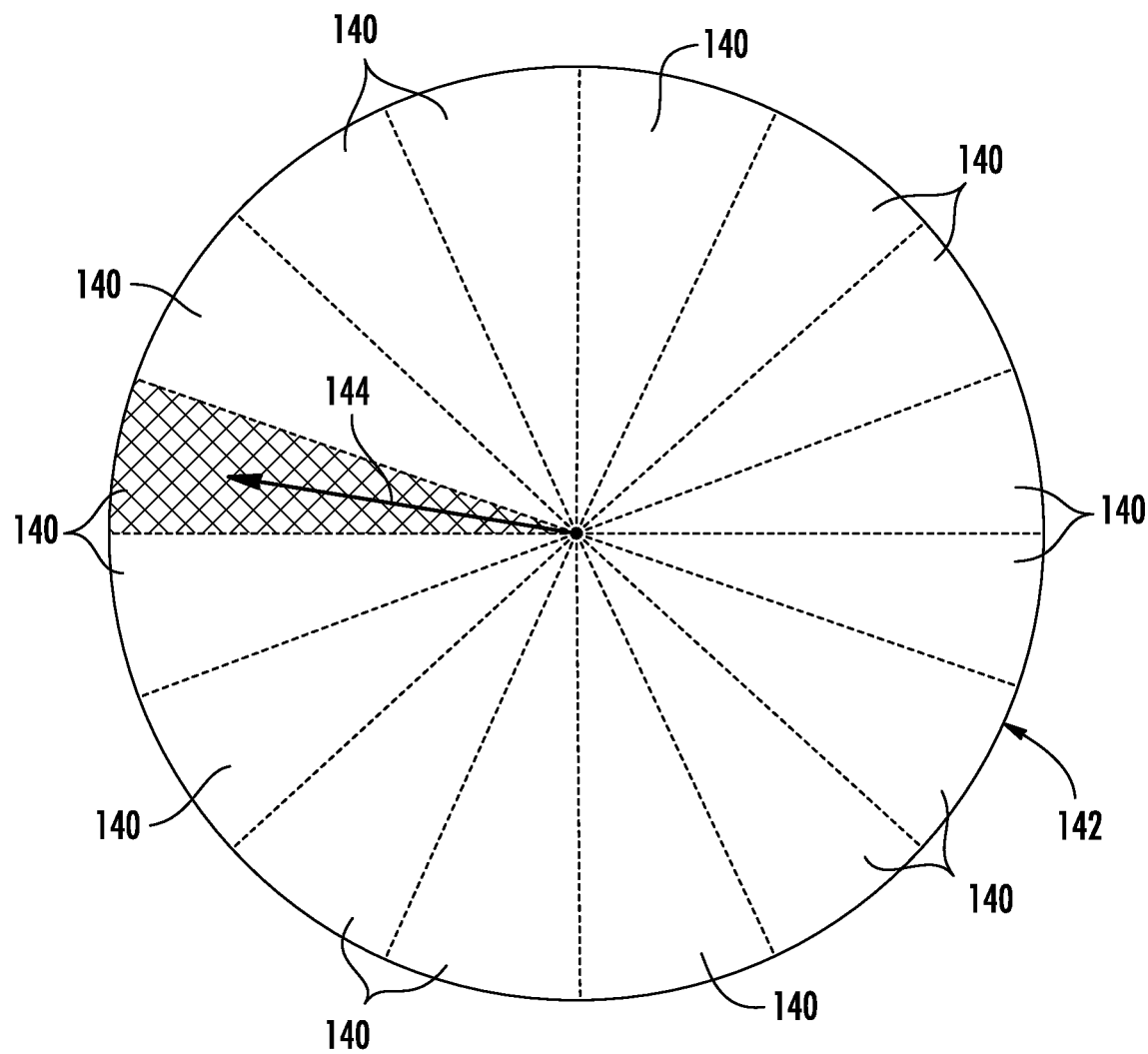
FIG. 5 illustrates an example of how the yaw travel range for a nacelle may be divided into a plurality of individual yaw sectors.

Additionally, as shown in FIG. 4, the turbine controller 26 may be configured to analyze yaw sector data associated with the wind turbine 10 (indicated at box 116) when selecting a curtailed operating setpoint(s) for the turbine 10. Specifically, in several embodiments, the yaw travel range for the nacelle 16 may be divided into a plurality of yaw sectors, with each yaw sector corresponding to an angular section of the entire travel range. For example, FIG. 5 illustrates a plurality of yaw sectors 140 defined for a nacelle 16 having a 360 degree yaw travel range (indicated by circle 142). As shown in FIG. 5, the yaw travel range 142 has been divided into sixteen different yaw sectors 140, with each yaw sector 140 corresponding to a 22.5 degree angular section of the travel range 142. However, in other embodiments, the yaw travel range 142 may be divided into any other suitable number of yaw sectors 140 correspond to any suitable angular section of the overall travel range. For example, in one embodiment, each yaw sector 140 may correspond to an angular section of the yaw travel range ranging from about 10 degrees to about 30 degrees, such as from about 15 degrees to about 25 degrees and all other subranges therebetween.

For each yaw sector 140 defined for the wind turbine 10, the turbine controller 26 may be configured to store historical wind data corresponding to one or more monitored wind parameter(s) for the yaw sector. For example, historical wind speed measurements, wind gust measurements, wind direction measurements, turbulence intensity measurements and/or the like may be collected and stored within the controller's memory 78 for each yaw sector 140. As a result, it may be determined whether a given yaw sector 140 is typically subjected to varying wind conditions based on its historical wind data. For example, the historical wind data may indicate that a particular yaw sector 140 is subject to recurring wind gusts or systematically experiences sudden shifts in wind direction.

In several embodiments, the historical wind data may be utilized to define one or more setpoint limits for the curtailed operating setpoint(s). Specifically, as indicated above, the controller 26 may be communicatively coupled to one or more sensors (e.g., a nacelle sensor(s) 72) that allow for the yaw angle or position of the nacelle 16 to be monitored, which may then allow the controller 26 to identify the yaw sector 140 within which the nacelle 16 is currently located (e.g., the current location of the nacelle 16 is indicated by arrow 144 in FIG. 5 such that the nacelle 16 is currently located within the cross-hatched yaw sector 140). The turbine controller 26 may then reference the historical data stored for the relevant yaw sector 140 to determine of such yaw sector 140 typically experiences substantially varying wind conditions. If the data indicates that the yaw sector 140 is typically not subjected to rapidly changing wind conditions, the turbine controller 26 may infer that the high variance calculated for the wind-dependent parameter(s) 104 may be due to another factor(s) or may simply correspond to an atypical operating event. In such instance, the setpoint limit(s) selected for the curtailed operating setpoint(s) may correspond to a relatively high operating setpoint(s) given that the variance is probably not due to recurring variations in the wind conditions. For example, the setpoint limit for the generator speed setpoint may be defined as a speed value that is only slightly less than the generator speed setpoint that would otherwise be commanded if the turbine controller 26 was utilizing its normal or non-curtailed operating setpoints. Alternatively, if the data indicates that the yaw sector 140 has historically been subjected to rapidly changing wind conditions, the turbine controller 26 may infer that the high variance calculated for the wind-dependent parameter(s) 104 is due to the varying wind conditions. In such instance, the setpoint limit(s) selected for the curtailed operating setpoint(s) may be correspond to a lower operating setpoint(s). For example, the setpoint limit for the generator speed setpoint may be defined as a speed value that is significantly less than the generator speed setpoint that would otherwise be used if the turbine controller 26 was commanding its normal or non-curtailed operating setpoints, thereby allowing for a larger speed margin to be provided for the wind turbine 10 given the increased likelihood of substantially varying wind conditions.

Referring back to FIG. 4, in several embodiments, the turbine controller 26 may also be configured to apply one or more suitable filters or S-functions (indicated at box 118) to the operating setpoint(s) determined by the controller 26 in order to smooth and stabilize the operation of the wind turbine 10 when transitioning between normal and curtailed operation. For example, in one embodiment, a low-pass filter may be utilized to limit the rate at which the wind turbine 10 is de-rated when transitioning from the use of non-curtailed operating setpoints to the use of curtailed operating setpoints. Similarly, the low pass filter may also be utilized to limit the rate at which the wind turbine 10 is up-rated when transitioning operation back from the use of curtailed operating setpoints to the use of non-curtailed operating setpoints.

As shown in FIG. 4, the turbine controller 26 may then command (at box 120) that the wind turbine 10 be operated at the resulting operating setpoint(s). For example, turbine controller 26 may command that the wind turbine 10 be operated at a given generator speed setpoint and a given generator torque setpoint. In doing so, the turbine controller 26 may be configured to implement any suitable control action that allows for the wind turbine 10 to be operated at the commanded setpoints. For instance, the controller 26 may de-rate or up-rate the wind turbine 10, as the case may be, by commanding that one or more of the rotor blades 22 be pitched about its pitch axis 28. As indicated above, such control of the pitch angle of each rotor blade 22 may be achieved by transmitting suitable control commands to each pitch adjustment mechanism 32 of the wind turbine 10. In other embodiments, the controller 26 may implement any other suitable control action in order to de-rate or up-rate the wind turbine 10 to the commanded setpoints, such as by modifying the torque demand on the generator 24 (e.g., by transmitting a suitable control command to the associated power converter (not shown) in order to modulate the magnetic flux produced within the generator 24) or by yawing the nacelle 16 to change the angle of the nacelle 16 relative to the direction of the wind.

Figure 6:
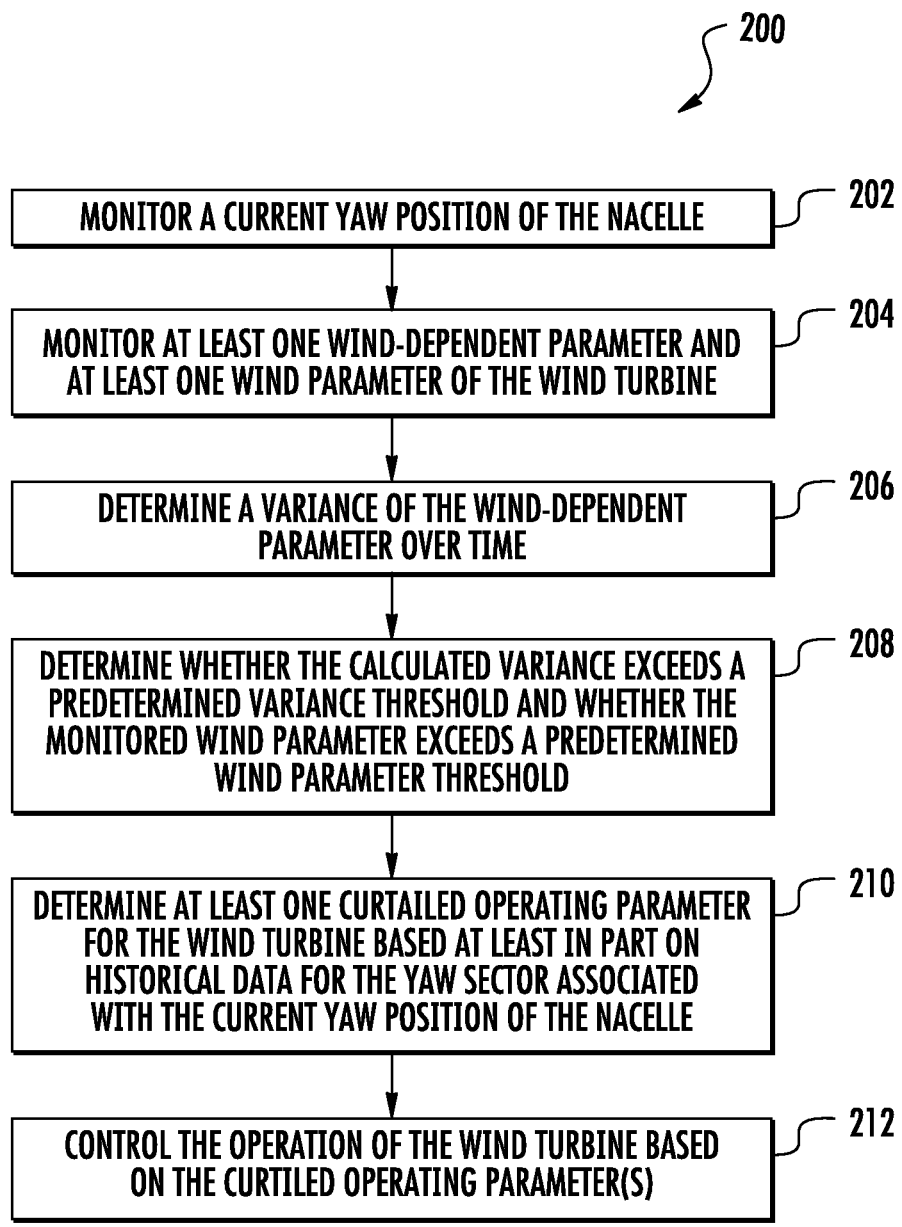
FIG. 6 illustrates a flow diagram of one embodiment of a method for controlling the operation of a wind turbine in accordance with aspects of the present subject matter, particularly illustrating method elements for implementing an embodiment of the control algorithm shown in FIG. 4.

Referring now to FIG. 6, a flow diagram of one embodiment of a method 200 for controlling the operation of a wind turbine is illustrated in accordance with aspects of the present subject matter. In general, the method 200 will be described herein with reference to implementing aspects of the control algorithm 100 described above with reference to FIG. 4. However, in other embodiments, the method 100 may be utilized in connection with any other suitable computer-implemented algorithm. Additionally, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown, at (202), the method 200 includes monitoring a current yaw position of the nacelle. As indicated above, by monitoring the yaw position of the nacelle 16, the turbine controller 16 may be configured to determine which yaw sector 140 in which that nacelle 16 is currently located. Additionally, at (204), the method 200 includes monitoring at least one wind-dependent parameter (e.g., generator speed) and at least one wind parameter of the wind turbine (e.g., wind speed). Moreover, at (206), the method 200 includes determining a variance of the wind-dependent parameter(s) over time. For example, as indicated above, the controller 26 may be configured to calculate a standard deviation of the generator speed occurring over a relatively short period of time, which may be indicative of the variability of the monitored wind parameter across such time period. Further, at (208), the method 200 includes determining whether the calculated variance exceeds a predetermined variance threshold and whether the monitored wind parameter exceeds a predetermined win parameter threshold. If so, at (210), the method 200 includes determining at least one curtailed operating setpoint for the wind turbine based at least in part on historical wind data for the yaw sector associated with the current yaw position of the nacelle. Specifically, as indicated above, the turbine controller 26 may be configured to take into account the historical wind data for the yaw sector 140 within which the nacelle 16 is currently located in order to determine whether such yaw sector 140 typically experiences rapidly changing wind conditions. If so, the controller 26 may be configured to establish a lower setpoint limit(s) for the operating setpoint(s) in order to provide an increased operating or safety margin for the wind turbine 10. Alternatively, if the yaw sector 140 is not typically subjected to rapidly changing wind conditions, the controller 26 may be configured to establish a higher setpoint limit(s) for the operating setpoint(s), such as a setpoint limit(s) near the normal operating setpoint(s) typically set for the wind turbine 10. Additionally, at (212), the method 200 includes controlling the operation of the wind turbine based on the curtailed operating setpoint(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the operation of a wind turbine, the method comprising:
monitoring, with a computing device, a current yaw position of a nacelle of the wind turbine, the current yaw position being located within one of a plurality of yaw sectors defined around a range of travel for the nacelle;
monitoring a wind parameter associated with the wind turbine;
comparing the monitored wind parameter to a predetermined wind parameter threshold;
monitoring, with the computing device, a wind-dependent parameter of the wind turbine;
determining, with the computing device, a variance of the wind-dependent parameter over time by calculating a standard deviation value for the wind-dependent parameter over time, wherein the variance is indicative of variations in the wind parameter;
determining, with the computing device, at least one curtailed operating setpoint for the wind turbine when the variance exceeds a predetermined variance threshold and when the wind parameter exceeds the predetermined wind parameter threshold, the at least one curtailed operating setpoint having a value which is less than a corresponding non-curtailed operating setpoint, wherein the at least one curtailed operating setpoint is determined based at least in part on historical wind data for the yaw sector associated with the current yaw position;
filtering, with the computing device, the at least one curtailed operating setpoint so as to smooth a transition between the at least one curtailed operating setpoint and the corresponding non-curtailed operating setpoint; and transitioning control of an operation of the wind turbine from the non-curtailed operating setpoint via the filtered at least one curtailed operating setpoint.

2. The method of claim 1, wherein determining the at least one curtailed operating setpoint comprises selecting an operating setpoint for the at least one curtailed operating setpoint that is at or below a setpoint limit established for the at least one curtailed operating setpoint based on the historical wind data for the yaw sector associated with the current yaw position.

3. The method of claim 2, wherein the setpoint limit is varied based on whether the historical wind data indicates a pattern of recurring variations in the wind parameter.

4. The method of claim 1, wherein the wind parameter comprises at least one of wind speed, wind direction, wind gust or turbulence intensity.

5. The method of claim 1, wherein the wind-dependent parameter comprises at least one of generator speed, generator torque or power output of the wind turbine.

6. The method of claim 1, wherein the at least one curtailed operating setpoint comprises at least one of a generator speed setpoint or a generator torque setpoint.

7. The method of claim 1, further comprising selecting the corresponding non-curtailed operating setpoint for the wind turbine when the variance does not exceed the predetermined variance threshold.

8. The method of claim 7, wherein the at least one curtailed operating setpoint corresponds to a reduction in at least one of a generator speed setpoint or a generator torque setpoint as compared to the at least one non-curtailed operating setpoint such that the wind turbine is de-rated when the operation of the wind turbine is transitioned from the at least one non-curtailed operating setpoint to the at least one curtailed operating setpoint.

9. A method for controlling the operation of a wind turbine, the method comprising:
monitoring, with a computing device, a current yaw position of a nacelle of the wind turbine, the current yaw position being located within one of a plurality of yaw sectors defined around a range of travel for the nacelle;
monitoring, with the computing device, a generator speed of the wind turbine;
monitoring, with the computing device, a wind speed associated with the wind turbine;
determining, with the computing device, a standard deviation of the generator speed over time, wherein the variance is indicative of variations in the wind speed;
determining, with the computing device, at least one curtailed operating setpoint for the wind turbine when the variance exceeds a predetermined variance threshold and when the wind speed exceeds a predetermined wind speed threshold, the at least one curtailed operating setpoint having a value which is less than a corresponding non-curtailed operating setpoint, wherein the at least one curtailed operating setpoint is determined based at least in part on historical wind data for the yaw sector associated with the current yaw position;
filtering, with the computing device, the at least one curtailed operating setpoint so as to smooth a transition between the at least one curtailed operating setpoint and the corresponding non-curtailed operating setpoint; and
transitioning an operation of the wind turbine from the non-curtailed operating setpoint via the filtered at least one curtailed operating setpoint.

10. The method of claim 9, wherein determining the at least one curtailed operating setpoint comprises selecting an operating setpoint for the at least one curtailed operating setpoint that is at or below a setpoint limit established for the at least one curtailed operating setpoint based on the historical wind data for the yaw sector associated with the current yaw position.

11. The method of claim 10, wherein the setpoint limit is varied based on whether the historical wind data indicates a pattern of recurring variations in the wind parameter.

12. A system for controlling the operation of a wind turbine, the system comprising:
a computing device including a processor and associated memory, the memory storing instructions that, when implemented by the processor, configure the computing device to:
monitor a current yaw position of a nacelle of the wind turbine, the current yaw position being located within one of a plurality of yaw sectors defined around a range of travel for the nacelle;
monitor a wind parameter associated with the wind turbine;
compare the monitored wind parameter to a predetermined wind parameter threshold;
monitor a wind-dependent parameter of the wind turbine;
determine a variance of the wind-dependent parameter over time by calculating a standard deviation value for the wind-dependent parameter over time, wherein the variance is indicative of variations in the wind parameter;
determine at least one curtailed operating setpoint for the wind turbine when the variance exceeds a predetermined variance threshold and when the wind parameter exceeds the predetermined wind parameter threshold, the at least one curtailed operating setpoint having a value which is less than a corresponding non-curtailed operating setpoint, wherein the at least one curtailed operating setpoint is determined based at least in part on historical wind data for the yaw sector associated with the current yaw position;
filtering, with the computing device, the at least one curtailed operating setpoint so as to smooth a transition between the at least one curtailed operating setpoint and the corresponding non-curtailed operating setpoint; and
transitioning an operation of the wind turbine from the non-curtailed operating setpoint via the filtered at least one curtailed operating setpoint.

13. The system of claim 12, wherein the computing device is configured to establish a setpoint limit for the at least one curtailed operating setpoint based on the historical wind data for the yaw sector associated with the current yaw position such that the at least one curtailed operating setpoint is selected as an operating setpoint that is at or below the established setpoint limit.

14. The system of claim 13, wherein the setpoint limit is varied based on whether the historical wind data indicates a pattern of recurring variations in the wind parameter.

15. The system of claim 12, wherein the wind parameter corresponds to at least one of wind speed, wind direction, wind gust or turbulence intensity.

16. The system of claim 12, wherein the wind-dependent parameter comprises at least one of generator speed, generator torque or power output of the wind turbine.

* * * * *